United States Patent Office 3,415,789
Patented Dec. 10, 1968

3,415,789
POLYMERS FROM PHOSPHONITRILIC HALIDES AND TETRAALKYL DIFUNCTIONAL CYCLO-BUTANES
Harry W. Coover, Jr., and Richard L. McConnell, Kingsport, Tenn., assignors to Eastman Kodak Company, Rochester, N.Y., a corporation of New Jersey
No Drawing. Continuation-in-part of abandoned application Ser. No. 337,748, Jan. 15, 1964. This application Feb. 8, 1967, Ser. No. 614,545
11 Claims. (Cl. 260—77.5)

ABSTRACT OF THE DISCLOSURE

Polymers which may be formed into films or protective coatings and which are extremely tough and flame resistant and which are quite stable even when heated to very high temperatures may be prepared from phosphonitrilic halides (preferably the cyclic trimer or cyclic tetramer) and tetraalkyl difunctional cyclobutanes in an organic solvent which is a solvent for the reaction product. Modified polymers are obtained by treatment of the polymers with difunctional molecules such as diisocyanates, dianhydrides, and diepoxides to effect the insolubilization.

---

This application is a continuation-in-part of Ser. No. 337,748, filed Jan. 15, 1964, now abandoned.

This invention relates to new polymers having improved properties and to prepolymers which may be heat-treated or otherwise chemically reacted to form these polymers, and more particularly concerns polymers prepared from the phosphonitrilic halides and certain difunctional alicyclic compounds condensable therewith.

In the field of polymer chemistry the search for polymers capable of giving tougher, more thermally stable, and more flame-resistant products such as films and surface coatings is a continuous one.

Objects of the present invention, therefore, are: to provide such tough, thermally stable, and flame-resistant polymers useful for a wide variety of applications; and to provide a commercially practicable process for preparing the same.

These and other objects hereinafter becoming evident have been achieved through the discovery that either the cyclic trimer or tetramer of $PNX_2$ wherein X is selected from the group consisting of chlorine and bromine when reacted with at least one compound selected from the group consisting of those having the formula

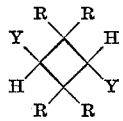

wherein R is a monovalent alkyl radical of from 1 to 3 carbon atoms and Y is a group capable of condensing with active halogen, produces tough, thermally stable polymers which may be readily formed into films and other shaped articles. Preferably, Y is selected from the group consisting of —OH, —OK, —ONa and —NH$_2$. This discovery is quite unexpected in view of the fact that phosphonitrilic halides themselves homopolymerize to rubbery, thermally unstable polymers.

The reaction may be carried out in a basic medium such as pyridine, quinoline, tributylamine and other amines which are solvents for the reaction product, at temperatures ranging from about —25° C. to about 400° C. In general, we prefer to prepare the linear polymer (prepolymer) in solution form at a temperature from about 0° C. to about 50° C. and later heat-treat the solution at a temperature of from about 100° C. to about 350° C. to insolubilize the polymer. Alternately, the linear polymer (prepolymer) solution may be treated with difunctional molecules such as diisocyanates to effect the insolubilization. Other crosslinking agents which could be used instead of the diisocyanates include dianhydrides such as pyromellitic anhydride and diepoxides such as 2,2-bis[p-(2,3-epoxypropoxy)phenyl] norcamphane,
2,2-bis[3,5-dichloro-4-(2,3-epoxypropoxy)phenyl] norcamphane,
1,3-bis(2,3-epoxypropoxy)2,2,4,4-tetramethylcyclobutane,
1,3-bis(2,3-epoxypropoxy)2,2-dimethylpropane,
1,4-bis(2,3-epoxypropoxymethyl) cyclohexane,
1,3-bis(2,3-epoxypropoxy)2,2,4-trimethylpentane,
5,5-bis[p-(2,3-epoxypropoxy)phenyl] hexahydro-4,7-methanoindane,
1,2,3,4-diepoxybutane,
3,3'-[isopropylidenebis(p-phenyleneoxy)]bis[1,2-epoxypropane],
1,2-bis(2,3-epoxypropoxy) ethane,
1,4-bis(2,3-epoxypropoxy) benzene, and
1,3-bis(2,3-epoxypropoxy) benzene.

Although many forms of the phosphonitrilic chlorides are known, we prefer to use the cyclic trimer or cyclic tetramer in making our thermally stable polymers. The products of this invention may be formed into films or protective coatings which are extremely tough and flame resistant and are quite stable even when heated to very high temperatures.

The process may be illustrated by the reaction between $(PNCl_2)_3$ and 2,2,4,4-tetramethyl-1,3-cyclobutanediol as follows:

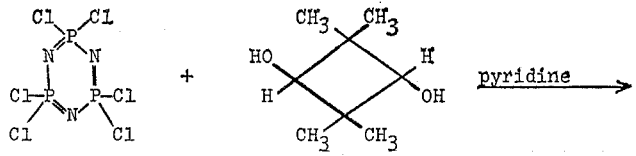

pyridine
→

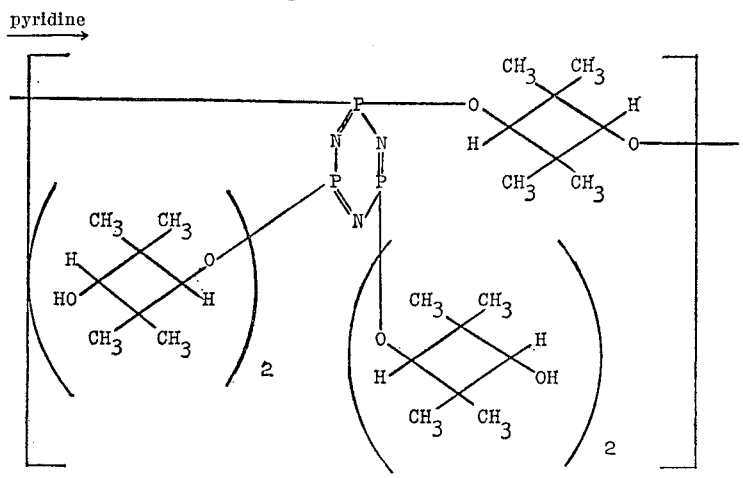

It is noted that the above formula is intended merely to show a probable linear structure of prepolymer. The heat treatment most likely acts to bridge across the hydroxyl groups of adjacent linear segments by a condensation reaction to crosslink and produce the insoluble polymer while the diisocyanate crosslinking agents from urethane linkages between the adjacent linear segments.

Although modified forms of the present polymers may be prepared by adding into the prepolymer formation reaction any compound such as the various glycols, amines, hydroxy amines and alcohols containing functional groups which could condense with the principal reactants, the improved properties of such modified polymers are attributable to the presence of predominant amounts, preferably over 50% by weight of the polymer, of the reaction product of the phosphonitrilic halide and the difunctional alkylated cyclobutane. Such modification may be made, for example, by the addition of ethylene oxide, through suitable catalytic reaction, to the alkylated cyclobutanediol to obtain the reactant

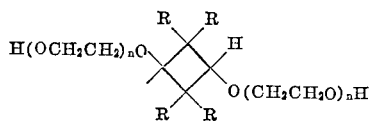

wherein R is as above defined and $n$ is any integer determined on the average by the ethylene oxide feed rate, reaction temperature, residence time, etc., and other limiting reaction parameters familiar to those skilled in the art.

The following examples will further illustrate the invention.

Example 1.—Polymer from phosphonitrilic chloride trimer and 2,2,4,4-tetramethyl-1,3-cyclobutanediol Phosphonitrilic chloride (0.0033 mole) and 2,2,4,4-tetramethyl-1,3-cyclobutanediol (0.01 mole) were mixed in 50 ml. of pyridine at 25° C. with stirring. A light yellow, clear solution was obtained which deposited a tough polymeric material after standing for several days. The insoluble polymeric material could be obtained by heating the pyridine solution to 115° C. for several hours. A similar polymeric material was obtained by reacting 0.01 mole of phosphonitrilic chloride trimer with 0.01 mole of 2,2,4,4-tetramethyl-1,3-cyclobutanediol in pyridine, and also by reacting 0.01 mole of $(PNCl_2)_3$ with 0.05 mole of 2,2,4,4-tetramethyl-1,3-cyclobutanediol in triethylamine.

Example 2.—Polymers from phosphonitrilic chloride tetramer and 2,2,4,4-tetramethyl-1,3-cyclobutanediol The phosphonitrilic chloride tetramer (0.0025 mole) was placed in 50 ml. of pyridine and 2,2,4,4-tetramethyl-1,3-cyclobutanediol (0.01 mole) was added with stirring. The reaction mixture was heated on a steam bath for 4 hours and the color of the reaction mixture changed from light yellow to amber. After standing for several days, 2 grams of a pale yellow, polymeric material precipitated from the solution. This material was pressed into a thin film and cured at 300° C. for several minutes to provide a very tough film. The reaction was repeated using 0.01 mole of phosphonitrilic chloride tetramer and 0.01 mole of 2,2,4,4-tetramethyl-1,3-cyclobutanediol in pyridine. The yield of polymer was quantitative after several hours reaction at 100° C. This polymer also gave a very tough film. Similar results were obtained when 0.01 mole of $(PNCl_2)_4$ was treated with 0.07 mole of 2,2,4,4-tetramethyl-1,3-cyclobutanediol.

Example 3.—Polymer from phosphonitrilic chloride trimer and 2,2,4,4-tetramethyl-1,3-cyclobutanediol 2,2,4,4-tetramethyl-1,3-cyclobutanediol (0.1 mole) was dissolved in 100 ml. of hot toluene and a sodium dispersion in toluene was added to prepare the disodium salt. Then phosphonitrilic chloride trimer (0.02 mole) was added with stirring and the toluene was allowed to reflux for several hours. The precipitated polymer was washed several times with water to remove the sodium chloride.

Example 4.—Polyurethane from phosphonitrilic chloride trimer 2,2,4,4-tetramethyl-1,3-cyclobutanediol polymer Phosphonitrilic chloride trimer (0.01 mole) was reacted with 2,2,4,4-tetramethyl-1,3-cyclobutanediol (0.05 mole) in pyridine solution. This solution of prepolymer was treated with 0.01 mole of hexamethylene diisocyanate to produce a white, insoluble, infusible polyurethane upon curing at 200° C. Similar results were obtained when tolylene diisocyanate or 4,4'-diisocyanato diphenylmethane was used instead of the hexamethylene diisocyanate.

Example 5.—Polymer from phosphonitrilic bromide and tetraethyl-1,3-cyclobutanediol A clear, tough, polymeric material was obtained when phosphonitrilic bromide trimer (0.01 mole) was reacted with tetraethyl-1,3-cyclobutanediol (0.01 mole) in pyridine solution according to the procedure of Example 1. Similar results were obtained when phosphonitrilic bromide tetramer and tetramethyl-1,3-cyclobutanediol were used.

Example 6.—Polymer from phosphonitrilic chloride and tetramethyl-1,3-cyclobutanediamine A tough polymeric material was obtained when phosphonitrilic chloride (0.01 mole) was reacted with tetramethyl-1,3-cyclobutanediamine (0.01 mole) in pyridine solution according to the procedure of Example 1.

Example 7.—Polymer from phosphonitrilic chloride and tetrapropyl-1,3-cyclobutanediol Phosphonitrilic chloride (0.01 mole) was reacted with tetrapropyl-1,3-cyclobutanediol (0.01 mole) using tributyl amine as the solvent according to the procedure of Example 1 to provide a polymeric material. After heat treatment at 300° C., the polymer was insoluble and infusible.

Example 8.—Polymer from phosphonitrilic chloride trimer and 2,2,4,4-tetramethyl-1,3-cyclobutanediol 2,2,4,4-tetramethyl-1,3-cyclobutanediol (0.1 mole) was dissolved in 100 ml. of hot toluene and a potassium dispersion (0.2 mole) in toluene was added to prepare the dipotassium salt. Then phosphonitrilic chloride trimer (0.033 mole) was added with stirring and the toluene was refluxed for 8 hours. The precipitated polymer was washed several times with water to remove the potassium chloride.

Example 9.—Polymer crosslinked by an epoxide compound

Phosphonitrilic chloride trimer (0.01 mole) was reacted with 2,2,4,4-tetramethyl-1,3-cyclobutanediol (0.04 mole) in pyridine solution. This solution of prepolymer was stirred while a solution of 2,2-bis[p(2,3-epoxypropoxy phenyl] norcamphane (0.025 mole) in dry toluene was added dropwise over a period of 1 hour. The reaction mixture was heated on the steam bath for 4 hours. The infusible, insoluble polymer which precipitated was isolated by filtering the reaction mixture. It was washed with methanol and dried.

Example 10.—Polymer crosslinked by a dianhydride

Phosphonitrilic chloride trimer (0.01 mole) was reacted with 2,2,4,4-tetramethyl-1,3-cyclobutanediol (0.04 mole) in pyridine solution. This solution of prepolymer was stirred while dry, powdered pyromellitic dianhydride (0.02 mole) was added in increments over a period of 1 hour. The reaction mixture was heated on the steam bath with stirring for 4 hours. The crosslinked polymer is insoluble and infusible.

The invention has been described in detail with particular reference to preferred embodiments thereof but it will be understood that variations and modifications can be effected within the spirit and scope of the invention as described hereinabove and as defined in the appended claims.

We claim:

1. Polymeric material comprising the product of the reaction of at least one compound selected from the group consisting of the cyclic trimer and tetramer of $PNX_2$ wherein X is selected from the group consisting of chlorine and bromine, with at least one cyclobutane derivative selected from the group having the formula

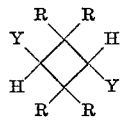

wherein R is a monovalent alkyl radical of from 1 to 3 carbon atoms and Y is selected from the group consisting of —OH, —OK, —ONa and —NH$_2$, the ratio of $PNX_2$ reactant to said cyclobutane derivative being from about 1:1 to about 1:7, said reaction occurring under basic conditions at a temperature of about −25° C. to about 400° C. and in the presence of an organic solvent.

2. A coating comprising the composition of claim 1 on a substrate.

3. A self-supporting film comprising the composition of claim 1.

4. The product formed by reacting at a temperature of at least −25° C. the product of claim 1 with a cross-linking agent selected from the group consisting of organic diisocyanates, dianhydrides and diepoxides, said cross-linking agent being present in the amount of at least 0.1 mole of cross-linking agent per mole of said product of claim 1.

5. A coating comprising the composition of claim 4 on a substrate.

6. A self-supporting film comprising the composition of claim 4.

7. The product formed by reacting the product of claim 1 with a cross-linking agent selected from the group consisting of hexamethylene diisocyanate, tolylene diisocyanate and 4,4'-diisocyanato diphenylmethane.

8. The product of the reaction of cyclic $(PNCl_2)_3$ with 2,2,4,4-tetramethyl-1,3-cyclobutanediol at a temperature of about −25° C. to about 400° C. under basic conditions and in the presence of an organic solvent, the ratio of the cyclic $(PNCl_2)_3$ reactant to the cyclobutane derivative reactant being from about 1:1 to about 1:7.

9. The product of the reaction of cyclic $(PNCl_2)_4$ with 2,2,4,4-tetramethyl-1,3-cyclobutanediol at a temperature of about −25° C. to about 400° C. under basic conditions and in the presence of an organic solvent, the ratio of the cyclic $(PNCl_2)_4$ reactant to the cyclobutane derivative reactant being from about 1:1 to about 1:7.

10. The product of the reaction of cyclic $(PNBr_2)_3$ with 2,2,4,4-tetramethyl-1,3-cyclobutanediol at a temperature of about −25° C. to about 400° C. under basic conditions and in the presence of an organic solvent, the ratio of the cyclic $(PNBr_2)_3$ reactant to the cyclobutane derivative reactant being from about 1:1 to about 1:7.

11. The product of the reaction of cyclic $(PNBr_2)_4$ with 2,2,4,4-tetramethyl-1,3-cyclobutanediol at a temperature of about −25° C. to about 400° C. under basic conditions and in the presence of an organic solvent, the ratio of the cyclic $(PNBr_2)_4$ reactant to the cyclobutane derivative reactant being from about 1:1 to about 1:7.

References Cited

FOREIGN PATENTS 740,979  8/1966  Canada.
1,270,800  7/1961  France.

DONALD E. CZAJA, *Primary Examiner.*

F. McKELVEY, *Assistant Examiner.*

U.S. Cl. X.R.

260—2, 47, 75, 615, 78; 117—161